(12) United States Patent
Tao et al.

(10) Patent No.: US 9,594,428 B2
(45) Date of Patent: Mar. 14, 2017

(54) AUGMENTING MOBILE COMPUTING DEVICE AUDIO OUTPUT VIA VIBRATION ELEMENTS

(71) Applicant: Intel Corporation, Santa Clara, CA (US)

(72) Inventors: Jiancheng Tao, Shanghai (CN); Hong W. Wong, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 22 days.

(21) Appl. No.: 14/126,796

(22) PCT Filed: Sep. 27, 2013

(86) PCT No.: PCT/CN2013/084483
§ 371 (c)(1),
(2) Date: Dec. 16, 2013

(87) PCT Pub. No.: WO2015/042879
PCT Pub. Date: Apr. 2, 2015

(65) Prior Publication Data
US 2016/0034033 A1    Feb. 4, 2016

(51) Int. Cl.
*G06F 3/01*       (2006.01)
*H04R 3/14*      (2006.01)
(Continued)

(52) U.S. Cl.
CPC .............. *G06F 3/016* (2013.01); *G06F 3/041* (2013.01); *G06F 3/162* (2013.01); *G06F 3/167* (2013.01);
(Continued)

(58) Field of Classification Search
CPC .......... G06F 3/016; G06F 3/041; G06F 3/162; G06F 3/167; H04R 2499/11; H04R 3/12
(Continued)

(56) References Cited

U.S. PATENT DOCUMENTS 6,809,635 B1 * 10/2004 Kaaresoja ............... H04M 1/03
340/384.73
2006/0239479 A1 * 10/2006 Schobben ........... H04M 1/0266
381/306
(Continued)

FOREIGN PATENT DOCUMENTS

| JP | 3183760 | 5/2013 |
|---|---|---|
| WO | WO-2013/093552 | 6/2013 |
| WO | WO-2013093552 | 6/2013 |

OTHER PUBLICATIONS

International Search Report and Written Opinion of the International Searching Authority mailed Jul. 3, 2014, in International Patent Application No. PCT/CN2013/084483, 14 pages.

(Continued)

*Primary Examiner* — Viet Pham
(74) *Attorney, Agent, or Firm* — Blakely, Sokoloff, Taylor & Zafman LLP

(57) ABSTRACT

Embodiments of the invention utilize one or more vibration elements to enhance the audio output of a computing device. These vibration element(s) may comprise any conventional vibrating element including a mass element (i.e., counterweight) electrically driven via an actuator to produce the vibrations. The size of the mass element/counterweight may be selected based on the desired strength and frequency for the vibration components (i.e., lower frequencies may utilized larger/heavier mechanisms). Computing devices may process audio data and separately output some of the data for speakers (higher frequency data), and some of the data for vibration elements (lower frequency data). The surface where the device is placed creates a sounding board structure and the vibration elements generate the sensation of physical motion at low, sub-bass and sub-audio frequencies. This physical motion may be perceived by the user as
(Continued)

low-frequency audio data, thereby enhancing the audio output of the speakers.

21 Claims, 6 Drawing Sheets

(51) Int. Cl.
  *G06F 3/041* (2006.01)
  *G06F 3/16* (2006.01)
  *H04R 3/12* (2006.01)
(52) U.S. Cl.
  CPC .............. *H04R 3/12* (2013.01); *H04R 3/14* (2013.01); *H04R 2499/11* (2013.01)
(58) Field of Classification Search
  USPC .................................................. 345/156, 173
  See application file for complete search history.

(56) References Cited

U.S. PATENT DOCUMENTS

| | | |
|---|---|---|
| 2007/0133821 A1 | 6/2007 | Yamaguchi |
| 2009/0245566 A1 | 10/2009 | Jheng |
| 2012/0250928 A1* | 10/2012 | Pance .................... H04R 9/066 381/386 |
| 2013/0044065 A1 | 2/2013 | Lee et al. |
| 2013/0297926 A1* | 11/2013 | Eaton ................ H04M 1/72569 713/100 |
| 2015/0237440 A1* | 8/2015 | Fromel .................... H04R 1/00 381/334 |

OTHER PUBLICATIONS

English Abstract of CN-102957792, published Mar. 6, 2013, inventors Gunmin Lee et al.
Written Opinion for PCT Application No. CN2013/084483, mailed on Apr. 7, 2016, 8 pages.

* cited by examiner

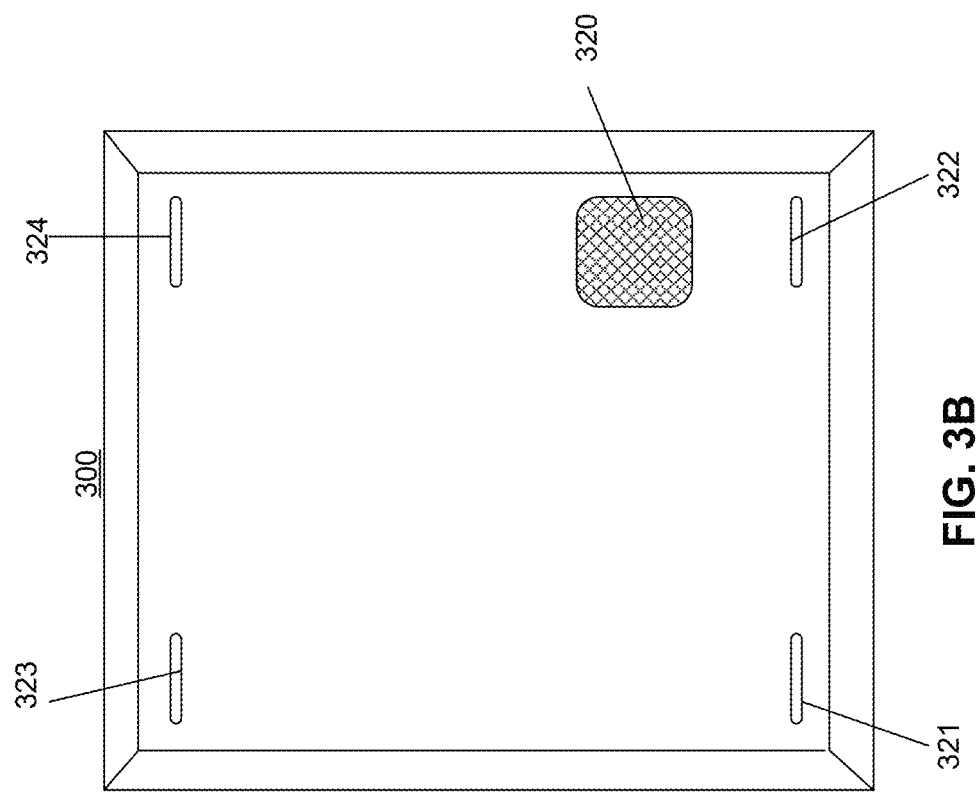
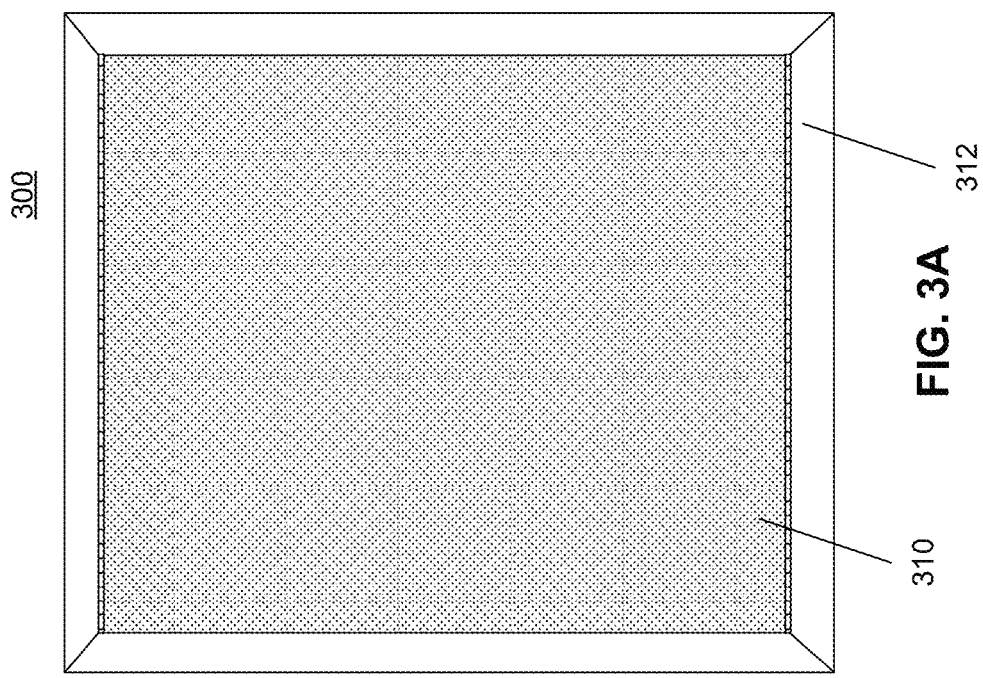

AUGMENTING MOBILE COMPUTING DEVICE AUDIO OUTPUT VIA VIBRATION ELEMENTS

CROSS-REFERENCE TO THE RELATED APPLICATION

This application is a U.S. National Phase application under 35 U.S.C. §371 of International Application No. PCT/CN2013/084483, filed Sep. 27, 2013, entitled "AUGMENTING MOBILE COMPUTING DEVICE AUDIO OUTPUT VIA VIBRATION ELEMENTS," the entire contents of which are incorporated herein by reference.

FIELD

Embodiments of the present invention generally pertain to computing devices and more specifically to audio subsystems of mobile computing devices.

BACKGROUND

Mobile computing devices, such as laptop computers, are designed to have a reduced form factor to decrease the device size and weight; however, this reduction in form factor causes said devices to include small, thin audio speakers that provide sub-optimal audio performance. Furthermore, handheld mobile computing devices such as smartphones and tablet computers are designed to maximize the user-facing surface for displaying graphic/video data, limiting the placement of the audio speakers and the output of audio data to the sides and/or rear of the device.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 3A and FIG. 3B are front-view and rear-view illustrations of a mobile computing device including an audio subsystem according to an embodiment of the invention.

Descriptions of certain details and implementations follow, including a description of the figures, which may depict some or all of the embodiments described below, as well as a discussion of other potential embodiments or implementations of the inventive concepts presented herein. An overview of embodiments of the invention is provided below, followed by a more detailed description with reference to the drawings.

DETAILED DESCRIPTION

Embodiments of the invention describe systems, apparatuses and methods for augmenting mobile computing device audio output via one or more vibration elements. Throughout this specification, several terms of art are used. These terms are to take on their ordinary meaning in the art from which they come, unless specifically defined herein or the context of their use would clearly suggest otherwise. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1:
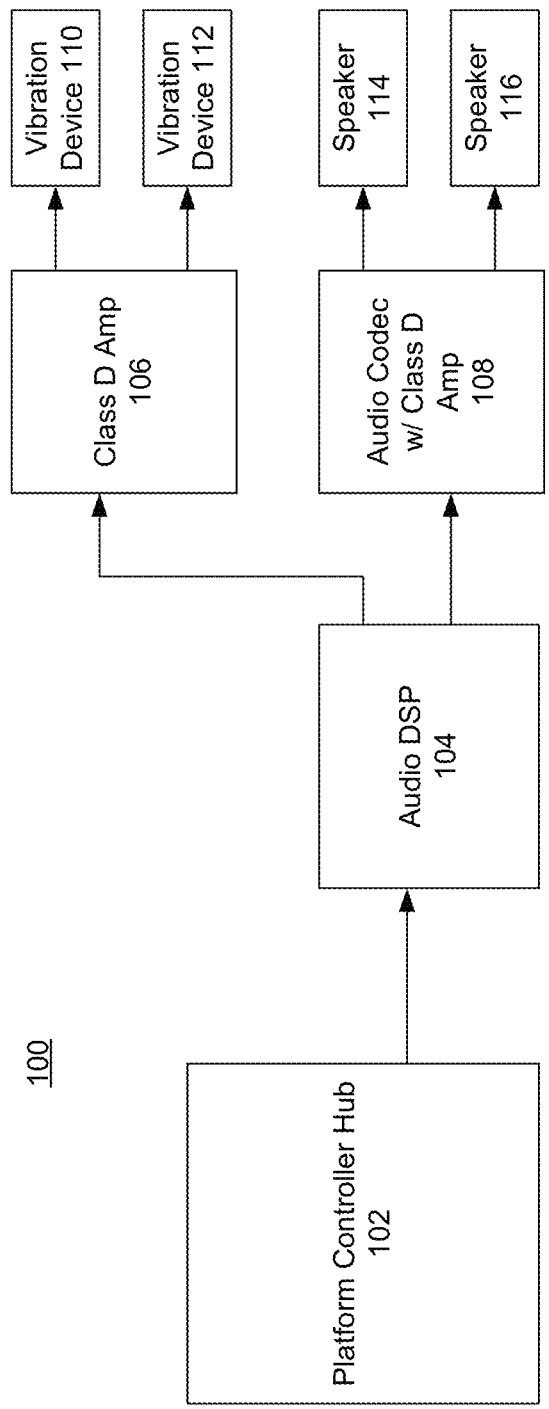
FIG. 1 illustrates a computing platform according to an embodiment of the invention.

FIG. 1 illustrates a computing platform according to an embodiment of the invention. In this embodiment, computing platform (or system) 100 may be included in stationary or mobile computing devices such as a desktop or server computer, portable computer, tablet, netbook, smart phone, etc. Computing platform 100 includes platform controller hub (PCH) 102, alternatively referred to herein as a system controller. A PCH and a central processing unit (CPU, not shown) may be included in separate chips or may be functional blocks of a system-on-chip (SOC) or other integrated computing chip. In this embodiment, PCH 102 is shown to be communicatively coupled to audio digital signal processor (DSP) 104. Audio DSP 104 is shown to transmit processed analog audio data to communicatively coupled amplifiers 106 and 108.

Audio amplifiers used in embodiments of the invention may include, for example, variations of class A, class B or class AB amplifiers, which include power output transistors to function as linear regulators for modulating the output voltage of the amplifier. Class D amplifiers, utilized in this embodiment, function as switching amplifiers with the switches either fully on or off, thereby significantly reducing the power consumption of the amplifiers.

Class D amplifiers 106 and 108 operate by first converting audio data input received from audio DSP 104 into modulated digital signals, which are then amplified and filtered to recover an analog output signal. Thus, class D amplifiers utilized by embodiments of the invention may include an analog-to-digital converter coupled to provide a digital output to a modulator; the modulator's output is received by a filter, functioning as a digital-to-analog converter, and the filter's output is subsequently transmitted to the audio output components described below. In class D amplifiers, only the digital signal is amplified by on/off digital signal processing, thus, class D amplifiers can have very high power efficiency since they provide substantially full output power, while minimizing internal power consumption.

Amplifier 108 is shown to output data to audio speakers 114 and 116 while amplifier 106 is shown to output data to vibration devices 110 and 112 to augment the output of the audio speakers, as described below. Amplifier 108 is illustrated as including an audio codec (i.e., audio coder/decoder); a codec may be used to convert digital audio data into an analog audio signal for playback by an audio device—i.e., speakers 114 and 116. An audio controller may provide an interface between the audio codec of amplifier 108 and audio DSP 104. In some embodiments, said audio controller may be included in a chipset of the processing system. The audio controller may send and receive audio data streams to and from the audio codec over a data link.

In this embodiment, vibration devices 110 and 112 work in combination with speakers 114 and 116 to output audio data processed from audio DSP 104. In computing devices such as mobile computing devices, a small form factor of the device is used to increase portability by reducing device volume and weight; however, this reduced form factor creates limited internal volume for speaker design. This limited speaker volume may result in poor sound quality, especially for lower frequency audio data, which typically is output via larger speaker components.

Embodiments of the invention utilize vibration elements to enhance the audio output of a computing device. Vibration components 110 and 112 may comprise any conventional vibrating elements including a mass element (i.e., counterweight) electrically driven via an actuator to produce the vibrations. The weight/mass of the mass element/counterweight may be selected based on the desired strength and frequency for the vibration components (i.e., lower frequencies may utilize larger/heavier mechanisms).

Thus, audio DSP 104 may process audio data and separately output some of the data for speakers 114 and 116 (such as higher frequency audio data), and some of the data for vibration elements 110 and 112 (such as lower frequency audio data). The vibration elements may be driven based on the audio data from audio DSP 104. For example, said vibration elements may comprise actuators to oscillate mass elements based on received waveform data, and the audio data may be used to change this waveform data (e.g., increase amplitude, peak duration, etc.).

Figure 2A:
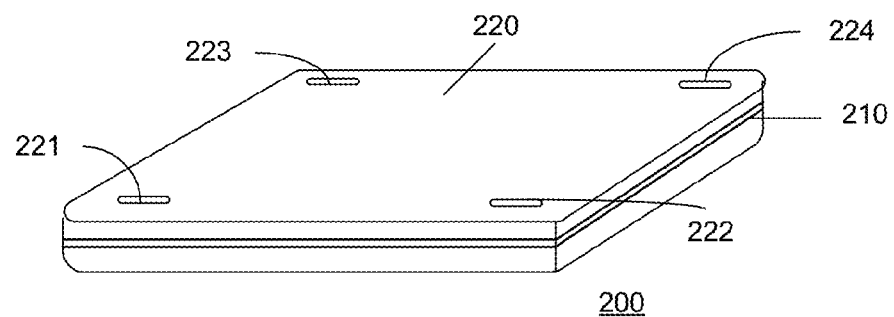
FIG. 2A and FIG. 2B are illustrations of a mobile computing device including an audio subsystem according to an embodiment of the invention.
Figure 2B:
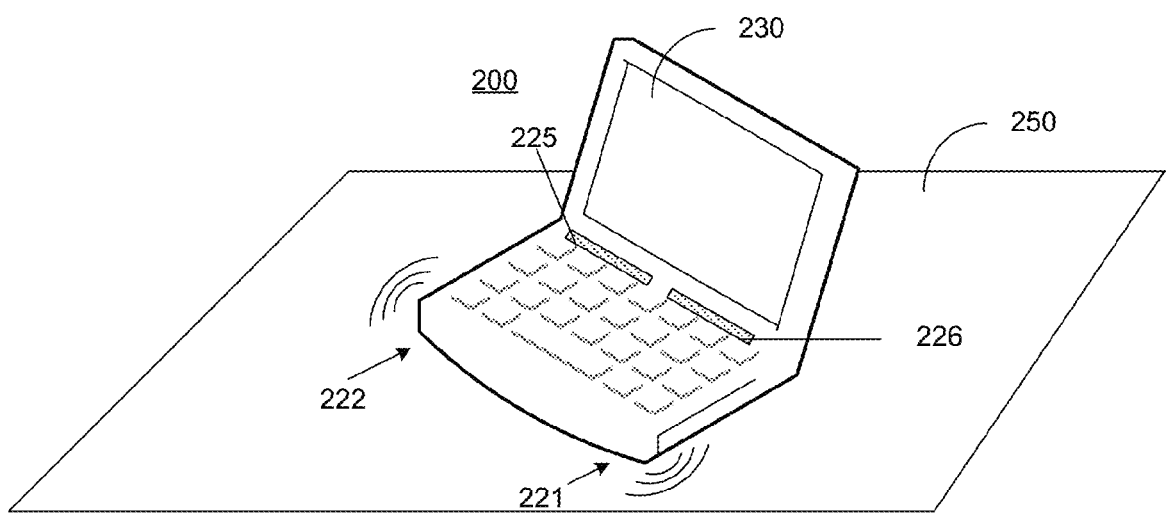

FIG. 2A and FIG. 2B are illustrations of a mobile computing device including an audio subsystem according to an embodiment of the invention. FIG. 2A illustrates the bottom side of mobile computing device 200, which is shown to comprise clamshell chassis 210 (i.e., a chassis including a hinge coupling a display and the keyboard) in a closed state. Bottom surface 220 is shown to include pads/feet 221-224 to provide airspace and traction when device 200 is placed upon a surface (as shown in FIG. 2B).

In this embodiment, pads/feet 221-224 each include vibration elements to enhance the audio subsystem of device 200. As these vibration elements are external to chassis 210, they do not increase or affect the internal volume of device 200. Said vibration elements may be selectively activated based on environmental factors of the usage context of device 200, as descried in further detail below.

FIG. 2B illustrates device 200 placed on surface 250, with clamshell chassis 210 in an open position. Mobile computing devices according to embodiments of the invention may utilize the surface where the device is placed on to create a sounding board structure and generate the sensation of physical motion at low, sub-bass and sub-audio frequencies. This physical motion may be perceived by the user as low-frequency audio data, thereby enhancing the audio output of speakers 225 and 226 (which output the other frequencies of the audio data).

Embodiments of the invention may selectively activate some, but not all, of the vibration elements included in the device. For example, excessive vibration of device 200 may adversely affect the performance of display 230, as the vibration may be transmitted to the display and impact its clarity. In this embodiment, vibration elements 221 and 222 are shown to be active, while vibration elements 223 and 224 are shown to be inactive to prevent this type of excessive vibration.

Furthermore, all of the vibration elements of a mobile computing device may be selectively deactivated. For example, when a user is in video viewing mode (e.g., determined based on a current application context and/or the position of display 230), some or all of vibration elements 221-224 may be switched on to enhance the audio output of speakers 225 and 226. In applications such as video/voice conferencing, all the vibration elements may be deactivated to conserve power, as these applications are unlikely to produce audio data at the relevant frequencies. Similarly, if device 200 is placed such that none of the feet/pads of the system are placed in direct contact with a surface, said vibration elements may be deactivated.

FIG. 3A and FIG. 3B are front-view and rear-view illustrations of a mobile computing device including an audio subsystem according to an embodiment of the invention. In this embodiment, mobile computing device 300 comprises a handheld mobile computing device; as used herein, the phrase "handheld mobile computing device" may describe a smartphone, a personal digital assistant (PDA) a tablet computer (e.g., unibody tablet computer with a touch screen interface), or any similar device. FIG. 3A illustrates device 300 having touch screen display and interface 310 surrounded by bezel 312.

The expected user form factor of handheld mobile computing devices may cause their audio speakers to be thin and placed in sub-optimal positions. FIG. 3B illustrates a rear-view of device 300, wherein speaker 320 is placed at the rear of the device. Device 300 is shown to include pads/feet 321-324 to provide airspace and traction when the device is placed upon a surface. In this embodiment, vibration elements to enhance the audio subsystem of device 300 are included in pads/feet 321-324. As these vibration elements are external and on the rear side of device 300, they do not affect the user form factor of the device.

Said vibration elements may be selectively activated based on the usage context of device 300, as descried above. Furthermore, handheld mobile computing devices may be placed in positions wherein only a subset of pads/feet 321-324 are placed in contact with a surface (e.g., pads 321 and 322 if device 300 is positioned in a "portrait" orientation, pads 321 and 323 if the device is placed in a "landscape" orientation). In other embodiments, said vibration elements may be placed in other areas in addition to or instead of pads/feet 321-324 (e.g., placed in portions near the edges of bezel 312 likely to come in contact with a surface during use).

Figure 4A:
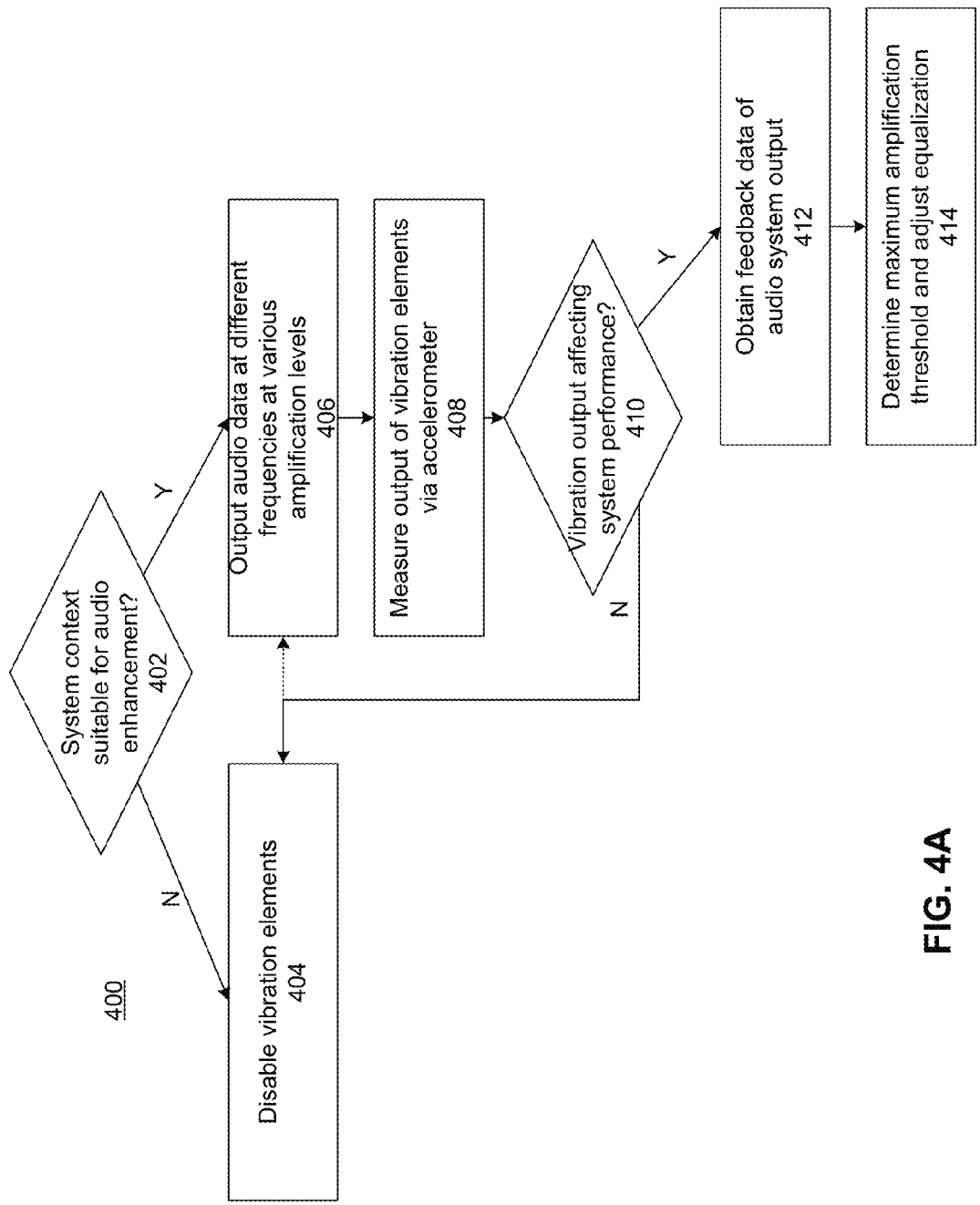
FIG. 4A is a flow diagram of a process for calibrating an audio subsystem according to an embodiment of the invention.

FIG. 4A is a flow diagram of a process for calibrating an audio subsystem according to an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

Process 400 includes operations for determining a system context of a mobile computing device that includes an audio subsystem including one or more vibration elements, 402.

Said system context may describe the current application in use; if the user is utilizing an application where lower frequency audio data is limited or nonexistent, vibration elements to enhance speaker output, as described above, may be disabled, 404. If the user is utilizing an application where lower frequency audio data may be generated, an audio subsystem of the mobile computing device may be further calibrated, as described below.

The audio subsystem may be calibrated by outputting audio data at different frequencies at various amplification levels, 406. An accelerometer or any similar motion detection device may be utilized to measure the output of the vibration elements, 408 to determine if system vibration is adversely affecting the system, 410. For example, a strong vibration may affect the clarity of viewing the display of the device, depending on the placement of the device, the surface contacting the device, etc.

If interference is measured in the presence of the lower system vibration setting, some of the vibration elements may be disabled (in which case, the calibration process would restart, 406) or all of the vibration devices may be disabled, 404. Otherwise, feedback data is obtained via an audio sensor (e.g., a microphone) or an accelerometer (to detect proper or excessive vibration), 412, as the audio data at various frequencies may vary based on the environment surrounding the device. This feedback data is used to determine a maximum amplification threshold (e.g., resonance frequencies), as well as adjust additional equalization settings (e.g., vibration oscillation factors), 414.

Figure 4B:
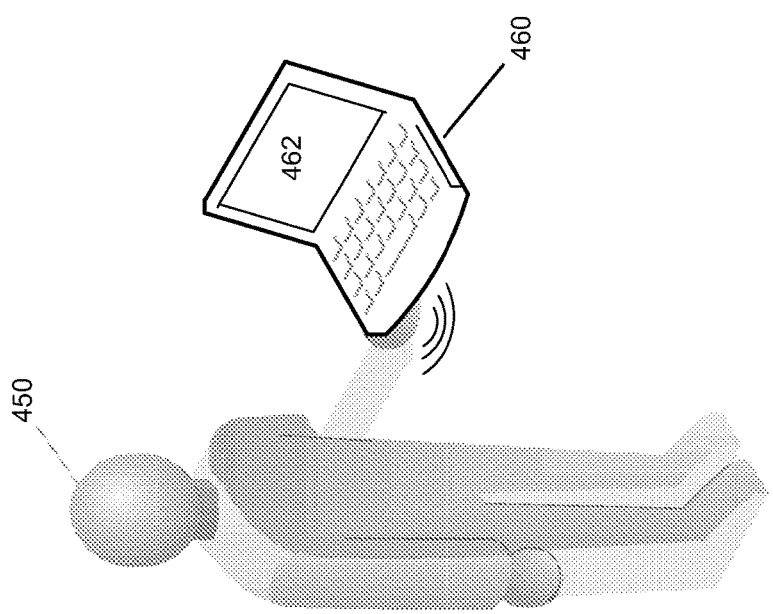
FIG. 4B is an illustration of a user utilizing a computing device calibrated according to the calibration process of FIG. 4A.

FIG. 4B is an illustration of a user utilizing a computing device calibrated according to the calibration process of FIG. 4A. In this example, user 450 is holding device 460, which includes multiple vibration elements on pads/feet included on the bottom surface of the device (similar to device 200 of FIG. 2A/2B). As described above with reference to process 400 of FIG. 4A, during calibration operations, an accelerometer may be utilized to measure the output of the multiple vibration elements on the pads/feet of the device. In this example, user 450 is holding device 460 by a corner, where at most one of the pads/feet of the device may resonate vibrations; this type of vibration resonance is not ideal for outputting audio data (unlike a tabletop or similar solid surface as illustrated in FIG. 2B). The vibration elements may thus be disabled, either as a result of vibrations to display 462 of device 460 (due to said display not being directly supported underneath) or from feedback data detecting sub-optimal output performance of the vibration elements.

Figure 5:
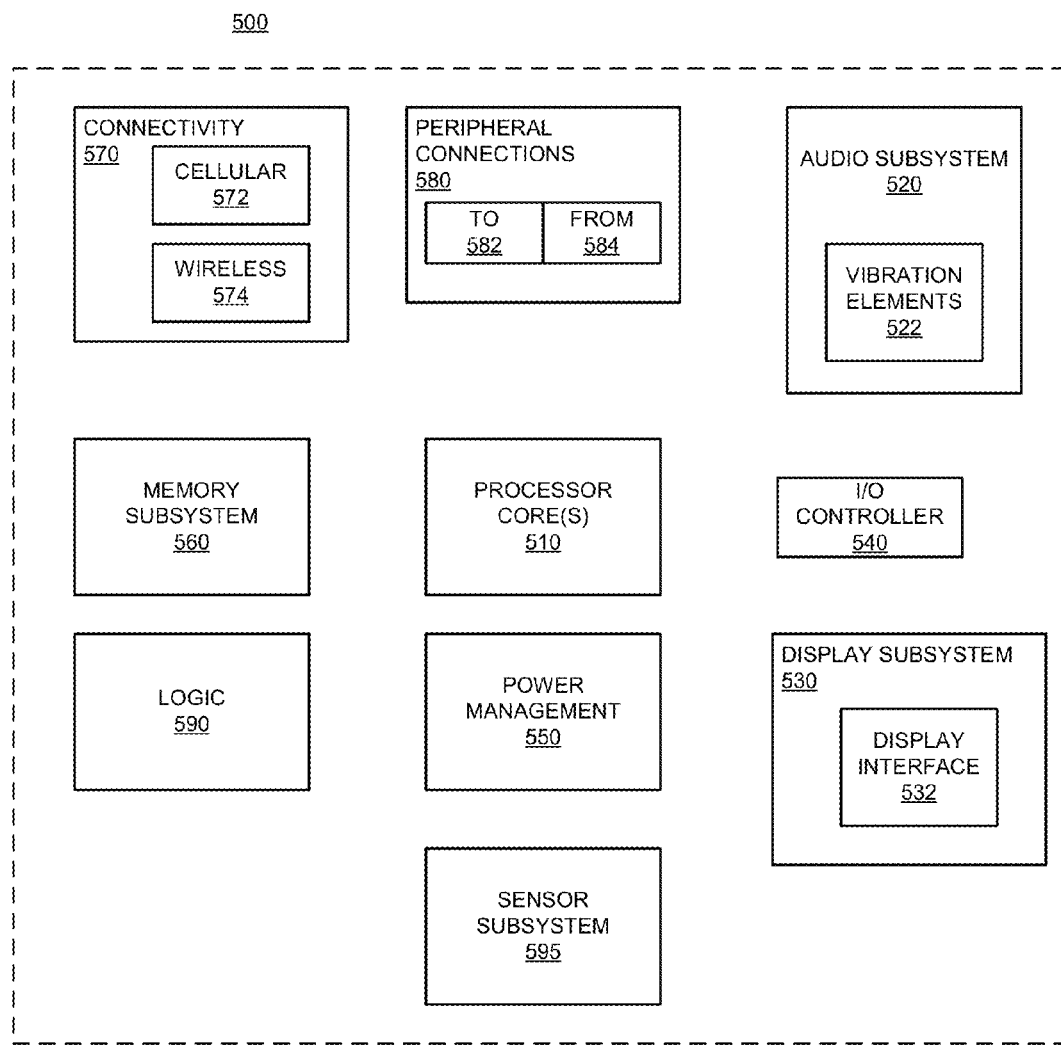
FIG. 5 is a block diagram of computing components to utilize audio subsystem enhancements according to an embodiment of the invention.

FIG. 5 is a block diagram of computing components to utilize audio subsystem enhancements according to an embodiment of the invention. It will be understood that certain of the components are shown generally, and not all components of such a device are shown in device 500. Furthermore, it will be understood that any of the illustrated components may be discrete components or may be components included on a system on a chip (SoC) integrated circuit (IC) (as shown in FIG. 5), and may be communicatively coupled through any direct or indirect means.

Any combination of the components of computing device 500 may be included in a stationary or mobile computing device, such as a desktop computer, computing tablet, a mobile phone or smartphone, a wireless-enabled e-reader, or other wireless mobile device. It will be understood that certain of the components are shown generally, and not all components of such a device are shown in device 500.

Device 500 includes one or more processor cores 510, which performs the primary processing operations of device 500. Processor core(s) 510 can include one or more physical devices, such as microprocessors, application processors, microcontrollers, programmable logic devices, processor cores, or other processing means. The processing operations performed by processor core(s) 510 include the execution of an operating platform or operating system on which applications and/or device functions are executed. The processing operations include operations related to I/O (input/output) with a human user or with other devices, operations related to power management, and/or operations related to connecting device 500 to another device. The processing operations may also include operations related to audio I/O and/or display I/O.

In one embodiment, device 500 includes audio subsystem 520, which represents hardware (e.g., audio hardware and audio circuits) and software (e.g., drivers, codecs) components associated with providing audio functions to the computing device. Audio subsystem 520 is shown to include vibration elements 522 for enhancing the speaker output performance of device 500, as described above. Audio functions can further include headphone output, as well as microphone input via any of the audio jacks described above. Devices for such audio output functions can be integrated into device 500, or connected to device 500. In one embodiment, a user interacts with device 500 by providing audio commands that are received and processed by processor core(s) 510.

Display subsystem 530 represents hardware (e.g., display devices) and software (e.g., drivers) components that provide a visual and/or tactile display for a user to interact with the computing device. Display subsystem 530 includes display interface 532, which includes the particular screen or hardware device used to provide a display to a user. In one embodiment, display interface 532 includes logic separate from processor core(s) 510 to perform at least some processing related to the display.

I/O controller 540 represents hardware devices and software components related to interaction with a user. I/O controller 540 can operate to manage hardware that is part of audio subsystem 520 and/or display subsystem 530. Additionally, I/O controller 540 illustrates a connection point for additional devices that connect to device 500 through which a user might interact with the system. For example, devices that can be attached to device 500 might include microphone devices, speaker or stereo systems, video systems or other display device, keyboard or keypad devices, or other I/O devices for use with specific applications such as card readers or other devices.

As mentioned above, I/O controller 540 can interact with audio subsystem 520 and/or display subsystem 530. For example, input through a microphone or other audio device can provide input or commands for one or more applications or functions of device 500. Additionally, audio output can be provided instead of or in addition to display output. In another example, if display subsystem includes a touchscreen, the display device also acts as an input device, which can be at least partially managed by I/O controller 540. There can also be additional buttons or switches on device 500 to provide I/O functions managed by I/O controller 540.

In one embodiment, I/O controller 540 manages devices such as accelerometers, cameras, light sensors or other environmental sensors, or other hardware that can be included in device 500. The input can be part of direct user interaction, as well as providing environmental input to the system to influence its operations (such as filtering for noise, adjusting displays for brightness detection, applying a flash for a camera, or other features). In one embodiment, device 500 includes power management 550 that manages battery power usage, charging of the battery, and features related to power saving operation.

Memory subsystem 560 includes memory devices for storing information in device 500. Memory can include nonvolatile (state does not change if power to the memory device is interrupted) and/or volatile (state is indeterminate if power to the memory device is interrupted) memory devices. Memory 560 can store application data, user data, music, photos, documents, or other data, as well as system data (whether long-term or temporary) related to the execution of the applications and functions of system 500. Memory 560 further stores firmware images related to boot path operations, and thus may include DRAM devices to store said firmware images as described above.

Connectivity 570 includes hardware devices (e.g., wireless and/or wired connectors and communication hardware) and software components (e.g., drivers, protocol stacks) to enable device 500 to communicate with external devices. The device could be separate devices, such as other computing devices, wireless access points or base stations, as well as peripherals such as headsets, printers, or other devices.

Connectivity 570 can include multiple different types of connectivity. To generalize, device 500 is illustrated with cellular connectivity 572 and wireless connectivity 574. Cellular connectivity 572 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity 574 refers to wireless connectivity that is not cellular, and can include personal area networks (such as Bluetooth), local area networks (such as Wi-Fi), and/or wide area networks (such as Wi-Max), or other wireless communication.

Peripheral connections 580 include hardware interfaces and connectors for implementing non-flash firmware storage support as described above, as well as software components (e.g., drivers, protocol stacks) to make peripheral connections. It will be understood that device 500 could both be a peripheral device ("to" 582) to other computing devices, as well as have peripheral devices ("from" 584) connected to it. Device 500 commonly has a "docking" connector to connect to other computing devices for purposes such as managing (e.g., downloading and/or uploading, changing, synchronizing) content on device 500. Additionally, a docking connector can allow device 500 to connect to certain peripherals that allow device 500 to control content output, for example, to audiovisual or other systems.

Logic 590 may comprise software logic, firmware logic, hardware logic, or a combination of two or more types of logic. In this embodiment, said logic may be used to support operations for enhancing device audio output, as described above. For example, logic 590 may receive data from data from sensor subsystem 595 (e.g., accelerometer or gyroscopic data) to detect proper or excessive vibration from vibration elements 522 when calibrating audio subsystem 520.

In addition to a proprietary docking connector or other proprietary connection hardware, device 500 can make peripheral connections 580 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

Embodiments of the invention describe systems including an audio digital signal processor (DSP) and an audio subsystem to output audio data processed by the audio DSP. The audio subsystem may further include one or more speakers to output a first portion of the audio data processed by the audio DSP and one or more vibration elements for generating vibration movements onto a surface contacting the system based, at least in part, on a second portion of the audio data processed by the audio DSP.

Some embodiments are incorporated in a laptop computer, which includes a display, a keyboard, and a frame including a hinge coupling the display and the keyboard, wherein the one or more vibration elements are disposed on a portion of the frame opposite the keyboard. In these embodiments, a plurality of pads may be disposed on the portion of the frame opposite the keyboard, wherein the one or more vibration elements are included in the plurality of pads.

Some embodiments are included in a mobile computing device such as a tablet or smartphone, including a frame, and a touchscreen display included in the frame, wherein the one or more vibration elements are disposed on a portion of the frame separate from the touchscreen display. For example, the one or more vibration elements may included in a bezel surrounding the touchscreen display.

In some embodiments, systems further include an audio subsystem controller to activate the one or more vibration elements based, at least in part, on a context of an application executed via the system. In some embodiments, systems further include an accelerometer, wherein the audio subsystem to activate the one or more vibration elements based, at least in part, on sensor data received from the accelerometer.

Embodiments of the invention may further include calibration logic to cause the one or more vibration elements to generate an initial set of vibration movements onto the surface, measure a propagation of the initial set of vibration movements onto the surface, and deactivate at least one of the one or more vibration elements based, at least in part, on the measured propagation of the initial set of vibration movements. The calibration logic may further determine which of the plurality of vibration elements are contacting the surface, and deactivate the vibration elements not contacting the surface. Systems may further include an audio sensor to capture the audio data output by the audio subsystem, wherein the calibration logic to further control the one or more vibration elements based, at least in part, on the captured audio data.

Embodiments of the invention describe an article of manufacture comprising a computer-readable non-transitory storage medium having instructions stored thereon to cause a processor to perform operations including transmitting control signals to one or more vibration elements to generate an initial set of vibration movements onto a surface contacting the one or more vibration elements, and receiving measurement data of a prorogation of the initial set of vibration movements. At least one of the vibration element(s) is activated based, at least in part, on the received measurement data. A first portion of audio data of an application is transmitted to an audio speaker, and control data is transmitted to the activated vibration element(s) for the activated vibration element(s) to generate vibration movements onto the contacting surface, the control data based, at least in part, on a second portion of the audio data of the application.

In some embodiments, the one or more vibration elements comprises a plurality of vibration elements, and the operations of the article of manufacture further include determining which of the plurality of vibration elements are contacting the surface, and deactivating the vibration elements not contacting the surface.

In some embodiments, the operations of the article of manufacture further include capturing, via an audio sensor, audio data output by the audio subsystem, and controlling the one or more vibration elements based, at least in part, on the captured audio data. The one or more vibration elements may also be activated based, at least in part, on an application context.

Embodiments of the invention describe apparatus comprising a first audio amplifier component, one or more speakers to output audio data received from the first audio amplifier component, a second audio amplifier component, and one or more vibration counterweights for generating vibration movements onto a contacting surface. The apparatus may further include an actuator for each of the one or more vibration counterweights to drive the respective vibration counterweight based, at least in part, on audio data received from the second audio amplifier component. In some embodiments, the apparatus further includes an accelerometer, wherein the one or more actuators are activated based, at least in part, on sensor data received from the accelerometer.

In some embodiments, an apparatus further includes calibration logic to cause the one or more actuators to drive the one or more vibration counterweights to generate an initial set of vibration movements onto the contacting surface, measure a propagation of the initial set of vibration movements onto the surface, and deactivate at least one of the one or more actuators based, at least in part, on the measured propagation of the initial set of vibration movements.

In embodiments where the one or more vibration counterweights comprises a plurality of vibration counterweights, and the calibration logic may further determine which of the plurality of vibration counterweights are contacting the surface, and deactivate the actuators corresponding to the vibration counterweights not contacting the surface.

In some embodiments, an apparatus may further include an audio sensor to capture the audio data output by the one or more speakers and the one or more vibration counterweights. The calibration logic may further control the one or more actuators based, at least in part, on the captured audio data.

Various components referred to above as processes, servers, or tools described herein may be a means for performing the functions described. Each component described herein includes software or hardware, or a combination of these. Each and all components may be implemented as logic such as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A computer readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable non-transitory storage medium may also include a storage or database from which content can be downloaded. Said computer readable medium may also include a device or product having content stored thereon at a time of sale or delivery. Thus, delivering a device with stored content, or offering content for download over a communication medium may be understood as providing an article of manufacture with such content described herein.

The invention claimed is:

1. A system comprising:
   an audio digital signal processor (DSP);
   an audio subsystem to output audio data processed by the audio DSP, the audio subsystem comprising:
      one or more speakers to output a first portion of the audio data processed by the audio DSP; and
      a plurality of vibration elements for generating vibration movements onto a surface contacting the system based, at least in part, on a second portion of the audio data processed by the audio DSP;
   a controller to selectively activate or deactivate each vibration element of the plurality of vibration elements based, at least in part, on a context of an application executed via the system;
   one or more motion sensors to generate sensor data for the generated vibration movement; and
   a display;
   wherein the controller is further to modify operation of one or more vibration elements of the plurality of vibration elements based, at least in part, on the sensor data indicating an adverse effect of the generated vibration movement on performance of the system, wherein the adverse effect on performance of the system includes an adverse effect on visual performance of the display of the system.

2. The system of claim 1, further comprising:
   a keyboard; and
   a frame including a hinge coupling the display and the keyboard, wherein the plurality of vibration elements are disposed on a portion of the frame opposite the keyboard.

3. The system of claim 2, further comprising:
   a plurality of pads disposed on the portion of the frame opposite the keyboard; wherein the plurality of vibration elements are included in the plurality of pads.

4. The system of claim 1, further comprising:
   a frame;
   wherein the display is a touchscreen display included in the frame, and wherein the plurality of vibration elements are disposed on a portion of the frame separate from the touchscreen display.

5. The system of claim 4, wherein the plurality of vibration elements are included in a bezel surrounding the touchscreen display.

6. The system of claim 1, wherein:
   the adverse effect on visual performance of the display of the system includes an adverse impact on clarity of the display.

7. The system of claim 1, further comprising:
calibration logic to:
cause the plurality of vibration elements to generate an initial set of vibration movements onto the surface; and
measure a propagation of the initial set of vibration movements onto the surface;
wherein the controller is further to deactivate one or more vibration elements of the plurality of vibration elements based, at least in part, on the measured propagation of the initial set of vibration movements.

8. The system of claim 7, wherein the calibration logic to further:
determine which of the plurality of vibration elements are contacting the surface; and
deactivate any vibration element of the plurality of vibration elements that is not contacting the surface.

9. The system of claim 7, further comprising:
an audio sensor to capture the audio data output by the audio subsystem; wherein the calibration logic to further control the plurality of vibration elements based, at least in part, on the captured audio data.

10. The system of claim 1, wherein:
the one or more motion sensors include an accelerometer; and
wherein the controller is to modify operation of one or more vibration elements of the plurality of vibration elements based, at least in part, on sensor data received from the accelerometer.

11. An article of manufacture comprising a computer-readable non-transitory storage medium having instructions stored thereon to cause a processor to perform operations including:
transmitting control signals to one or more vibration elements of a plurality of vibration elements in a system to generate an initial set of vibration movements onto a surface contacting the plurality of vibration elements, the system including a display;
receiving measurement data from one or more motion sensors regarding a propagation of the initial set of vibration movements;
selectively activating one or more vibration elements of the plurality of vibration elements based, at least in part, on the received measurement data;
transmitting a first portion of audio data of an application to an audio speaker;
transmitting control data to the one or more activated vibration elements for the activated vibration elements to generate vibration movements onto the contacting surface, the control data based, at least in part, on a second portion of the audio data of the application; and
modifying operation of one or more vibration elements of the plurality of vibration elements based, at least in part, on the measurement data indicating an adverse effect of the generated vibration movements on performance of the system, wherein the adverse effect on performance of the system includes an adverse effect on visual performance of the display of the system.

12. The article of manufacture of claim 11, wherein the operations further include:
determining which of the plurality of vibration elements are contacting the surface; and
deactivating any vibration element of the plurality of vibration elements not contacting the surface.

13. The article of manufacture of claim 11, wherein the operations further include:
capturing, via an audio sensor, audio data output by the audio subsystem; and
controlling the plurality of vibration elements based, at least in part, on the captured audio data.

14. The article of manufacture of claim 11, wherein the operations further include:
activating the plurality of vibration elements based, at least in part, on an application context.

15. An apparatus comprising:
a first audio amplifier component;
one or more speakers to output audio data received from the first audio amplifier component;
a second audio amplifier component;
a plurality of vibration counterweights for generating vibration movements onto a contacting surface;
an actuator for each of the vibration counterweights to drive the respective vibration counterweight based, at least in part, on audio data received from the second audio amplifier component;
a controller to selectively activate or deactivate each of the actuators based, at least in part, on a context of an application executed via the apparatus;
one or more motion sensors to generate feedback data for generated vibration movement; and
a display;
wherein the controller is further to modify operation of one or more of the actuators based, at least in part, on the feedback data indicating an adverse effect of the generated vibration movement on performance of the apparatus, wherein the adverse effect on performance of the apparatus includes an adverse effect on visual performance of the display of the apparatus.

16. The apparatus of claim 15, further comprising:
calibration logic to:
cause the actuators to drive the plurality of vibration counterweights to generate an initial set of vibration movements onto the contacting surface;
measure a propagation of the initial set of vibration movements onto the surface; and
deactivate at least one of the actuators based, at least in part, on the measured propagation of the initial set of vibration movements.

17. The apparatus of claim 16, wherein the calibration logic to further:
determine which of the plurality of vibration counterweights are contacting the surface; and
deactivate the actuators corresponding to the vibration counterweights not contacting the surface.

18. The apparatus of claim 16, further comprising:
an audio sensor to capture the audio data output by the one or more speakers and the plurality of vibration counterweights; wherein the calibration logic to further control the actuators based, at least in part, on the captured audio data.

19. The apparatus of claim 15, wherein:
the one or more motion sensors include an accelerometer; and
wherein the controller is to modify operation of one or more actuators based, at least in part, on sensor data received from the accelerometer.

20. The apparatus of claim 15, wherein:
the adverse effect on visual performance of the display of the apparatus includes an adverse impact on clarity of the display.

21. The article of manufacture of claim 11, wherein:
the adverse effect on visual performance of the display of the system includes an adverse impact on clarity of the display.

* * * * *